July 7, 1942.  R. F. FRIZZELL  2,289,114
SAW SET
Filed April 17, 1941  2 Sheets-Sheet 1
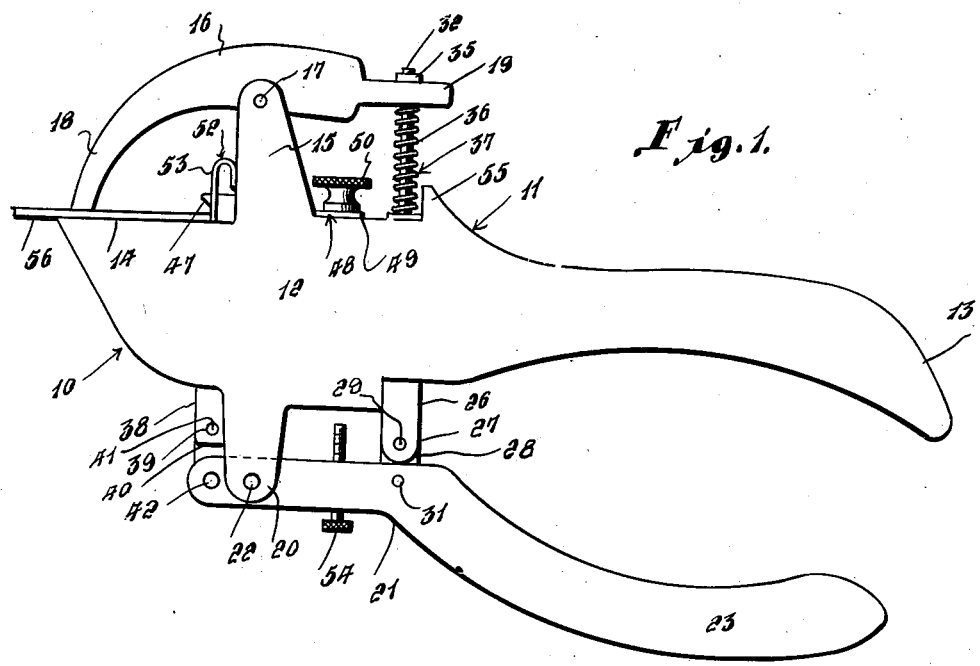
Inventor
Robert F. Frizzell
By L. F. Randolph
Attorney July 7, 1942.   R. F. FRIZZELL   2,289,114
SAW SET
Filed April 17, 1941   2 Sheets-Sheet 2
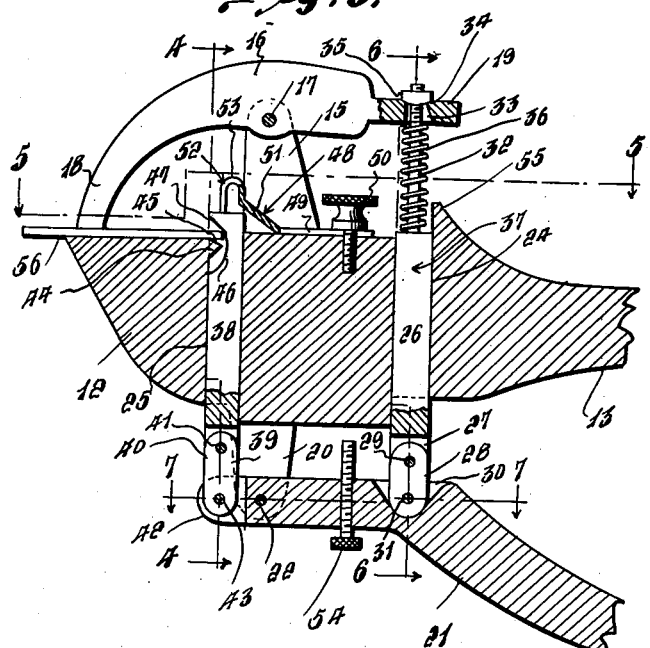
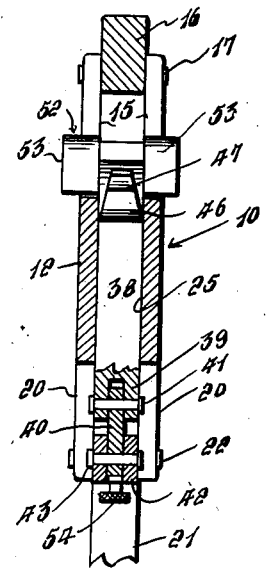
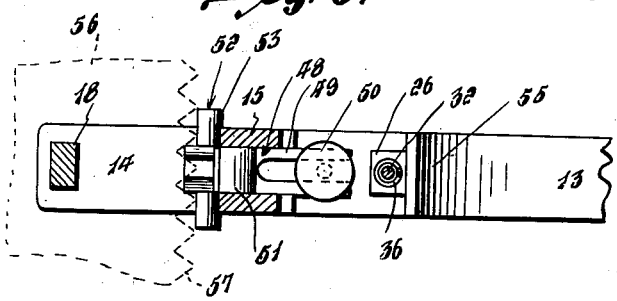
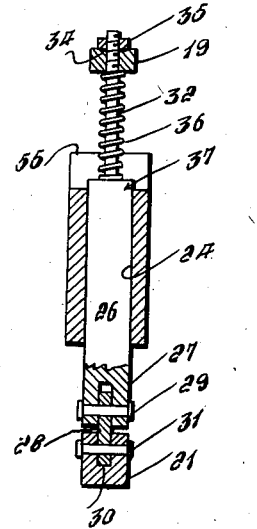
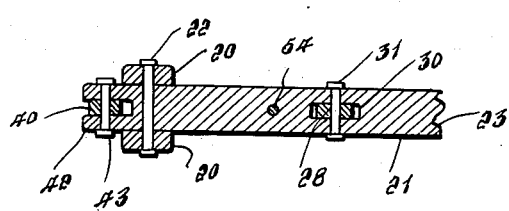
Inventor
Robert F. Frizzell
By
Attorney Patented July 7, 1942

2,289,114

UNITED STATES PATENT OFFICE 2,289,114

SAW SET

Robert F. Frizzell, Truro, Nova Scotia, Canada

Application April 17, 1941, Serial No. 389,062

7 Claims. (Cl. 76—69)

This invention relates to a portable hand operated device for setting the teeth of a saw and more particularly to a device adapted to be held in the hand by two handle portions thereof and operated by compressing the handle portions for initially clamping the saw blade relatively to the tool and for subsequently setting a tooth of the blade.

More particularly, it is an aim of the invention to provide a saw setting tool of simple construction having gage means for correctly positioning the teeth of a saw relatively to the setting means thereof, for clamping the saw blade before the tooth to be set is engaged, and setting means for thereafter engaging and setting the tooth of the saw, said clamping means and tooth setting means being operable by the movement of a lever in one direction.

Other objects and advantages of the invention will hereinafter become more fully apparent from the following description of the drawings, which illustrate a preferred embodiment thereof, and wherein:

Figure 1 is a side elevational view of the saw set,

Figure 2 is a top plan view of the same,

Figure 3 is a fragmentary vertical sectional view, partly in elevation of the same, Figure 4 is a transverse vertical sectional view taken substantially along the plane of the line 4—4 of Figure 3, Figure 5 is a horizontal sectional view taken substantially along the plane of the line 5—5 of Figure 3, Figure 6 is a transverse vertical sectional view taken substantially along the plane of the line 6—6 of Figure 3, Figure 7 is a horizontal sectional view taken substantially along the plane of the line 7—7 of Figure 3, Figure 8 is a perspective view of one of the parts of the saw set, and Figure 9 is a perspective view of the tooth gage.

Referring more particularly to the drawings, wherein like reference characters designate like or corresponding parts throughout the different views, 10 designates generally the saw set including a base member 11, one end of which forms a stationary jaw 12, and the other end of which is shaped to form a handle 13. The jaw 12 is provided with a substantially flat face 14 on its upper side and adjacent its outer end. A pair of transversely opposed spaced arms 15 extend upwardly from the jaw 12, and rearwardly of the face 14 for supporting a movable jaw 16. The intermediate portion of the jaw 16 is disposed between the upper ends of the arms 15 and pivotally connected thereto by a pin 17. The jaw 16 is provided with a tapered downwardly curved forward end 18, the free end of which is adapted to coact with the face 14, as will hereinafter be described, and the opposite end of the movable jaw 16 is restricted to form the portion 19.

A pair of ears 20 depend from the jaw 12 for mounting a lever 21, a portion of which is disposed between the lower, free ends of the ears 20 and pivotally connected thereto by means of a pin 22. The lever 21 is pivotally connected to the ears 20 adjacent one end thereof and the opposite end of the lever is disposed beneath the handle 13 and is curved to form a handle portion 23. As best seen in Figure 3, the base member 11 is provided with two perpendicular bores 24 and 25 which extend therethrough. The bore 24 is disposed substantially at the junction of the jaw 12 and handle 13 and the bore 25 is disposed forwardly of the arms 15 and ears 20 and opens at its upper end into the face 14.

A bar 26 is slidably mounted in the bore 24 and is provided with a bifurcated lower end 27 in which is disposed one end of a link 28 which is pivotally connected thereto by a pin 29. The lever 21, between the handle portion 23 and its pivot 22 is provided with a recess 30 in its upper side into which extends the opposite end of the link 28 and through which extends a pin 31 for pivotally connecting said opposite, lower end of the link 28 to the lever 21. The recess 30, as best seen in Figure 3, diverges towards its open end to permit the link 28 to rock relatively to the lever 21 as will hereinafter become apparent. Bar 26 is provided with a restricted stem 32 which projects from its upper end and which is provided with a threaded upper end which extends through an opening 33 in the restricted portion 19. The opening 33 is substantially larger than the stem 32 and the portion thereof adjacent the free end of the restricted portion 19 is flared downwardly and away from the stem 32 to permit the stem to swing relatively to the portion 19 when the jaw 16 is rocked on its pivot 17. The upper side of the portion 19 is also provided with a concave portion 34 communicating with the upper end of the opening 33 and forming a seat for the rounded under side of a nut 35 which is attached to the upper, threaded end of the stem 32 to detachably connect the stem to the jaw 16. An expansion coil spring 36 is mounted on the stem 32 and has one end thereof bearing against the upper end of the bar 26 and its opposite end bearing against the under side of the restricted portion 19. Bar 26, link 28, stem 32, and nut 35 combine to form the connecting means, designated generally 37 between the lever 21 and the jaw 16.

A bar 38 is reciprocally mounted in the bore 25 and is provided with a bifurcated lower end 39 in which is disposed one end of a link 40 which is pivotally connected thereto by means of a pin 41. Lever 21 at its end, opposite to the handle portion 23 and on the other side of the pivot 22 is bifurcated at 42 to receive the opposite end of the link 40 which is pivotally connected thereto by a pin 43. A projection 44 extends into the forward side of the upper end of the bore 25 and is provided with an upper face 45 which is inclined toward the face 14. The projection 44 forms an anvil, as will hereinafter become apparent. The bar 38, adjacent its upper end is provided with a recessed portion 46 in its forward side to accommodate the anvil 44. The recessed portion 46 at its upper end forms an inclined face 47 which is disposed substantially parallel to the face 45.

A saw tooth gage, designated generally 48 includes an elongated plate having a substantially flat elongated bifurcated end 49 which is disposed on the upper side of the jaw 12 and between and rearwardly of the arms 15. A set screw 50, provided with a knurled head, is mounted in the upper portion of the jaw 12 and extends through a bifurcated portion 49 for adjustably positioning the gage 48 relatively to the jaw 12. The plate, forming the gage 48, as best seen in Figures 3 and 9, is provided with an upwardly inclined intermediate portion 51 and a widened bifurcated opposite end 52, the head portion of which is disposed at an oblique angle to the inclined portion 52 and substantially perpendicular to the face 14 and the furcations 53 of which are bent back upon themselves, adjacent their joined ends, so that the free ends thereof extend downwardly and are likewise disposed substantially perpendicular to the face 14. The upper end of the bar 38 which is tapered and in which is formed the recess 46, as best seen in Figure 4, extends above the face 14 and into the space between the furcations 53.

A set screw 54 extends upwardly through the lever 21 between its pivot 22 and the recess 30 and is adapted to be moved into abutting engagement with the under side of the jaw 12 for limiting the movement of the handle 23 towards the handle 13. The member 11 is provided with an upstanding portion 55 adjacent the bore 24 and forming an abutment to be engaged by the free end of the portion 19 for limiting the downward movement of said end of the jaw 16.

Assuming the parts of the saw set 10 to be in the position, as seen in Figures 1 and 3, by moving the handle 23 slightly away from the handle 13 the rocking movement of the lever 21 will rock the jaw 16 to raise its end 18 out of contact with a saw blade, indicated at 56, and which is resting on the face 14. This will also cause the bar 38 to be raised but only slightly due to the fact that its link 40 is connected to the lever 21 much closer to its pivot 22 than is the link 28 of the connecting means 37. The saw tooth gage 48 is adjusted relatively to the jaw 12 and to the upper end of the bar 38 to limit the extent to which the blade 56 can be moved into the space between the faces 45 and 47. As seen in Figure 5, the teeth 57 of the saw blade 56 are disposed so that one tooth is arranged between the faces 45 and 47 and the teeth on either side thereof abut against the lower ends of the furcations 53. The handle 13 is adapted to be held in the palm of the hand with the handle 23 engaged by the fingers for pressing the handle 23 toward the handle 13 to rock the lever 21 on its pivot 22. This will cause the connecting means 37 to be moved upwardly and the bar 38 to be drawn downwardly but, as previously pointed out, the connecting means 37 will move more rapidly than the bar 38 so that the end 18 of the jaw 16 will be swung downwardly and into clamping engagement with the blade 56 before the inclined face 47 contacts the tooth 57 to be set. It will thus be seen that after the blade 56 has been clamped between the jaws 12 and 16 the bar 38 continues to move downwardly to cause a tooth 57 to be set between the face 47 and the face 45 of the anvil 44 to a pitch corresponding to the inclination of the faces 45 and 47. After the end 18 has engaged the saw blade 56 to prohibit further rocking movement of the jaw 16, the stem 32 is caused to slide upwardly relatively to the opening 33 by further upward movement of the handle 23 thereby compressing the spring 36 which acts to yieldably hold the end 18 in engagement with the saw blade 56 with increasing pressure as the handle 23 continues to move upwardly. The set screw 54 is adjusted to abut against the under side of the jaw 12 when the handle end 23 of the lever 21 is moved upwardly sufficiently to set the saw tooth 57 which is disposed over the anvil 44. As the handle 23 is swung in the opposite direction, bar 38 will be moved upwardly to release the tooth which has been set and at the same time the spring 36 will expand until the inclined face 47 is moved out of engagement with the aforementioned saw tooth 57 and the nut 35 has again contacted the concave portion 34 after which further movement of the handle 23 will rock the jaw 16 to raise its end 18 and to lower the end 19. The portion 19 will engage the abutment 55 to limit the movement of the parts toward a released position. It will be obvious that with the parts thus positioned the saw blade 56 may be adjusted to place another tooth in a position to be set and the operation then repeated.

Various modifications and changes are contemplated and may obviously be resorted to as only a preferred embodiment of the invention has been disclosed.

I claim as my invention:

1. A tool of the character described comprising a member forming a rigid jaw and handle portion, said jaw including an anvil portion, a jaw pivotally mounted on said member and disposed above said first mentioned jaw, a lever having a handle portion at one end thereof, said lever being disposed beneath said member and pivotally connected thereto adjacent its opposite end, means yieldably connecting said lever to one end of said last mentioned jaw on one side of its pivot, and a slide reciprocally mounted in the first mentioned jaw and connected to said lever on the other side of its pivot, said slide having an inclined portion for coacting with the anvil portion for clamping a tooth therebetween for setting the tooth when the handle portion of the lever is swung toward the handle portion of said member, and said last mentioned jaw being movable, by the operation of said lever, for coacting with the first mentioned jaw for clamping the blade of the saw therebetween.

2. A saw set comprising a stationary jaw, a movable jaw pivotally connected to the stationary jaw and disposed on one side thereof, a slide reciprocally mounted in the stationary jaw and having a portion for engaging and setting a saw tooth when the slide is retracted, a plunger slidably mounted in the stationary jaw and having one of its ends connected to the movable jaw, and operating means pivotally mounted on the stationary jaw and connected to the plunger and slide and operable for initially actuating the movable jaw for clamping a saw blade between the jaws and for thereafter actuating the slide for setting a tooth of the saw, said plunger and slide being connected to the operating means on opposite sides of the pivot thereof.

3. A saw set comprising a stationary jaw having a handle portion at one end thereof, said stationary jaw being provided with an anvil portion, a movable jaw pivotally mounted above the stationary jaw, a lever having a handle portion at one end disposed beneath said first mentioned handle portion, said lever being pivotally connected adjacent its opposite end to the stationary jaw, a block slidably mounted in the stationary jaw and connected to said lever on one side of its pivot, said block being provided with a notch having an inclined face for coacting with the anvil portion for setting a saw tooth when the block is retracted, a plunger slidably mounted in the stationary jaw and connected at one end to the lever, on the opposite side of its pivot, and yieldably connected at its opposite end to the movable jaw, the handle portion of said lever being movable toward said first mentioned handle portion for actuating the movable jaw for clamping a saw blade between the jaws and for retracting said block for setting a tooth of the saw between its inclined portion and said anvil portion.

4. A saw set as in claim 3, said plunger having an upper portion including a restricted stem projecting upwardly from the stationary jaw and extending through and loosely mounted in an end of the movable jaw, an abutment on the upper end of said stem for engaging the upper side of said end of the movable jaw, and a partially tensioned coil spring mounted on said stem and disposed beneath said end of the movable jaw.

5. A saw set comprising a base member having plungers slidably mounted therein, a clamping member pivotally mounted, intermediate of its ends above said base member, a lever pivotally mounted, adjacent one end thereof beneath the base member, the lower ends of said plungers being connected to the lever on opposite sides of its pivot, one of said plungers being connected at its opposite end to an end of the clamping member and being arranged to be moved upwardly when the lever is swung upwardly, for actuating the jaw for clamping a saw blade between the jaw and the base member, said base having an anvil portion and said other plunger being arranged to be moved downwardly by the upward movement of the lever and having a downwardly facing tooth setting portion cooperating with the anvil portion for engaging and setting a tooth of the saw.

6. A saw set as in claim 5, said last mentioned plunger having a notch for receiving said tooth of the saw and provided with an inclined upper part forming the tooth setting portion, and said anvil portion being inclined and disposed substantially parallel to the tooth setting portion.

7. A saw set as in claim 5, comprising a gage having a bifurcated end, the furcations of said end being arranged one on either side of said last mentioned plunger and forming abutments for restricting the movement of the saw blade toward said last mentioned plunger.

ROBERT F. FRIZZELL.